3,151,994
MOLDING OF REFRACTORY MATERIALS

Karl Adlassnig, Munich, Germany, assignor to Elektroschmelzwerk Kempten G.m.b.H., Munich, Germany
No Drawing. Filed Dec. 12, 1961, Ser. No. 158,899
Claims priority, application Germany Dec. 20, 1960
38 Claims. (Cl. 106—39)

This invention relates to the production of molded shapes of refractory materials, such as silicon nitride, silicon carbide, boron nitride, boron carbide, aluminum boride and aluminum nitride.

It is well known that carbides, nitrides and borides are exceptionally high melting refractory materials, and thus are not amenable to conventional molding or casting processes for the formation of shaped structures. As a consequence thereof, the prior art is replete with many suggestions pertaining to methods facilitating the production of shaped objects, these methods, by and large, utilizing one or several binding agents which, like an adhesive, weld finely ground particles of refractory materials into a coherent mass. Examples of these binding agents include various clay-containing materials, metals, silicates, silicon nitride, boron nitride, alloys and oxides. (These processes employing binding agents are fundamentally different from the conventional powder metallurgy process which depends on atomic surface forces of the molded material, rather than a binding agent.)

These processes leave much to be desired from the standpoint of both ease of processing, and properties of the final product. For example, a process has already been disclosed which employs corundum (a trigonal crystalline form of aluminum oxide). This process, incorporating 75% corundum and 25% silicon carbide must be heated for a period of at least sixteen hours at 1650° C. If higher temperatures are employed, such as above 1800° C., special electric furnaces are required which, of course, significantly increases the investment cost for the process and correspondingly increases the cost of the final product. Furthermore, if small quantities of the binding agent are employed, which is generally desirable, the heating requirements of the process are even more demanding and complicated.

The main object of this invention, therefore, is to avoid the disadvantages of the prior art by employing a process in which there is utilized relatively small quantities of binding agent, and wherein relatively lower temperatures and shorter firing (sintering) times can be employed.

Another object of this invention is to provide a surface-hardened shaped refractory by a simple expedient.

Still another object is to provide a composition comprising a novel mixture of materials which serves as a highly efficient binding agent.

Upon further study of the specification and appended claims, other advantages and objects of the present invention will become apparent.

To accomplish the objects of this invention, a process is employed comprising the steps of uniformly mixing a refractory material with a mixture of gamma-aluminum oxide (cubic crystals) with finely divided aluminum metal, wetting said mixture, pressing said moistened mixture to form a desired shape, drying said desired shape, and then heating said dried shape to about at least 1400° C. for a sufficient time to form a cohesive solid, with or without pressure being simultaneously applied.

It is to be noted that the manipulative process steps, per se, are conventional, so the essence of this invention resides in the choice and quantity of binding agent, and the temperature at which the refractory material can be sintered.

This invention is particularly applicable to the manufacture of shaped structures of silicon nitride, silicon carbide, boron nitride, boron carbide, aluminum boride and aluminum nitride. In general, these materials can be employed in a particle size range up to 1 mm. The specific selection of particle size is dependent on the particularly desired density of the final product. For example, if a highly dense material is required, then a range of particle size is employed so that the fine particles can fill the interstices between the coarse particles. For a more comprehensive discussion of the selection of particle size ranges, reference is directed to any standard textbook treating the subject of powder metallurgy.

Based on the total volume of refractory material and binding agent, it is preferred to limit the content of binding agent to about 15% in order to avoid any significant change in the properties of the refractory material. Generally, the binding agent, based on the total volume of the mixture of binding agent and refractory material, contains 1–10% gamma-aluminum oxide and 0.01–5% metallic aluminum. By "volume" this term refers to actual volume, as measured, for instance by adding the material to a graduate containing liquid and noting the rise of the meniscus.

The gamma-aluminum oxide is desirable employed in a particle size range of $5–50.10^{-6}$ mm. (5–50 mµ), the bulk density corresponding to approximately 50 g./l. The gamma-aluminum oxide can be prepared, for example, by reacting gaseous aluminum halide at high temperatures with oxygen. By employing this finely divided gamma-aluminum oxide in this invention, it is thus possible to lower the sintering temperature to as low as 1400° C., and to limit the addition thereof to 1–10% by volume, thereby resulting in many major advantages; lower investment, energy and material requirements for the sintering step, and a higher quality product. For a more complete discussion of methods to prepare gamma-aluminum oxide, reference is made to German Patent No. 1,062,689.

The metallic aluminum which is employed in conjunction with the gamma-aluminum oxide is also in a finely divided state, having a particle size preferably in the range of about $10^{-3}$ to $10^{-1}$ mm. Any conventional commercial aluminum powder can be employed, inasmuch as there is no requirement for an ultra-high purity material to be used. This metallic aluminum, when used in conjunction with gamma-aluminum oxide, improves the sintering operation as well as the coherency of the final product.

It is to be appreciated that the novel binding agent comprising gamma-aluminum oxide and aluminum powder can be packaged and sold as such to parties interested in fabricating shaped structures of refractory materials.

After the binding agent and the refractory material are mixed, then it is conventional to add a wetting agent, such as methanol, so that the mixture can be pressed in the wet condition into a predetermined form. The wetting agent is then vaporized by a conventional drying step. For a more detailed discussion of these two steps, reference is made to the forming of cemented carbide, which in part is formed into shaped articles using methanol, camphor or other substances as binding waxes on pressing in dies.

The dried shaped object of binding agent and refractory material is then heated to at least 1400° C. to sinter the mass into a coherent solid. Preferably, it is more economical to limit the temperature to 1700° C. because at higher temperatures, there is nothing to be gained. At temperatures lower than 1400° C., the coherency of the final product is insufficient. Consequently, the preferred temperature range for the sintering step is 1400–1700° C.

With respect to the time of heat treatment, obviously it is dependent on the specific temperature that is employed, and in a conventional furnace, upon the size of the shaped object that is heated. It is to be pointed out, however, that this invention permits the use of shorter heating times at lower temperatures than the prior art. For example, a cylindrical object of about 20 mm. diameter by 20 mm. length can be sintered in about one hour by the process of this invention, as compared to a required heating time of sixteen hours at a temperature of 1650° C. for shaped objects containing corundum as a binder.

The sintering step can be conducted in any environment which is inert to the carbides, nitrides and borides treated by this invention. Preferably, it is desirable to conduct this step in a reducing atmosphere. As examples of reducing atmospheres, there can be employed environments, such as a mixture of carbon monoxide with nitrogen, which originates from the reaction of air with an excess of carbon at elevated temperatures.

In addition to the discovery of a highly advantageous binding composition and the available operating condition which can be employed as a consequence thereof, a preferred embodiment of this invention encompasses a simple procedure to obtain a smooth, hard, abrasion-resistant surface of the finished articles without the necessity of further treatments subsequent to the sintering step. This advantageous surface is produced by covering the shaped bodies after the preliminary drying step with a mixture of materials which can react to form the refractory material. For example, in the production of silicon carbides, the surface can be covered with a mixture of silicon powder and carbon in approximately stoichiometric proportions. The particle size of the silicon powder and carbon can range between $10^{-4}$ to $5.10^{-2}$ mm., and the amount of coating material that can be applied can be varied from 0.05 to 5 g./cm.$^2$. It is to be recognized, however, that the particle size and quantity of material applied to the surface can be varied widely according to the type of surfaces desired. These coating materials can be applied by any conventional means, a methanol suspension of same being preferred.

In addition to a coating of silicon and carbon for silicon carbide, several other systems can be employed, e.g., for boron carbide, a mixture of boron and carbon may be employed, and for aluminum boride, a mixture of aluminum and boron may be employed.

When the coated shaped object is sintered, an alloy is formed from the respective components, which alloy serves to close the pores of the surface, thus making the surface smoother and harder. A refractory so treated exhibits a surface which cannot be scratched, even with a steel pin.

The shaped refractory structures produced by this invention can be employed where materials are required to resist elevated temperatures and corrosive conditions. Also, the shaped products of this invention can be used where extreme hardness and resistance to abrasion are desired properties of a material of construction.

It is believed that the foregoing description of this invention is more than adequate to teach those skilled in the art to use this invention, but for purposes of illustration, the following preferred specific embodiments are presented. It is to be appreciated, however, that the following examples are not to be held as limitative in any way whatsoever with regard to the remainder of the specification and appended claims.

Example 1

92% by volume of silicon carbide (particle size 0.02 to 1 mm.) are mixed with 5% by volume of finely divided gamma-aluminum oxide, and 3% fine aluminum powder. This mixture is moistened, and then formed into cylindrical articles, 20 mm. diameter and height, under a pressure of 1 t/cm.$^2$. After being dried, the compacted articles are covered with a thin layer of a mixture of silicon and carbon by immersing the articles into a suspension of fine silicon powder and gas soot (weight ratio 28:12) in methanol. The sintering process is accomplished in a nitrogen-containing, reducing atmosphere at 1580° C. for one hour.

The resultant molded bodies have a density of 2.5–2.7 g./cm.$^3$. Their resistance to temperature changes is remarkably high. They resist the shock of quenching from a temperature of 1600° C. into cold water without change. These materials also exhibit resistance to fire and pressure at temperatures of 1800° C. and above.

Example 2

88% by volume of boron nitride which is free of boric acid is mixed with 8% finely divided aluminum oxide and 4% aluminum powder. The mass is slightly moistened with methanol and after the pressing procedure, is sintered at 1550° C. in a nitrogen-containing, reducing atmosphere for one hour. The resultant molded bodies are not as dense as the pressure-sintered ones, but are, however, equally crack-free and easily workable.

Example 3

90% by volume of boron carbide (particle size 0.02–1 mm.) is mixed with 6% finely divided aluminum oxide and 2% aluminum powder, moistened, and compacted to articles under 1 t/cm.$^2$. After the drying process, it is sintered at 1600° C. in a reducing atmosphere for one hour without the utilization of a protective coating. The molded bodies have a density between 1.6 and 1.9.

The preceding general and detailed description of this invention is deemed sufficient for one skilled in the art to realize the essential characteristics therein. It is appreciated, moreover, that one skilled in the art can, employing the teachings of this invention, make certain modifications to adapt this invention to various usages and conditions, e.g., the employment of the novel binding agent of this invention for the production of molded shapes of all types of materials melting above 1400° C. Consequently, it is equitable, proper and intended that such changes and modifications fall within the scope of equivalence of the following claims.

What is claimed is:

1. A binding agent comprising in parts by volume 1–10 parts gamma-aluminum oxide having a particle size of about $5-50.10^{-6}$ mm. and 0.01–5 parts by volume of aluminum having a particle size of about $10^{-3}-10^{-1}$ mm., said gamma-aluminum oxide being produced by reacting gaseous aluminum halide at high temperatures with oxygen.

2. A binding agent consisting essentially of in parts by volume 1–10 parts gamma-aluminum oxide having a particle size of about $5-50.10^{-6}$ mm. and 0.01–5 parts by volume of aluminum having a particle size of about $10^{-3}-10^{-1}$ mm., said gamma-aluminum oxide being produced by reacting gaseous aluminum halide at high temperatures with oxygen.

3. A sinterable composition consisting essentially of a refractory material selected from the group consisting of silicon carbide, silicon nitride, boron carbide, boron nitride, aluminum nitride and aluminum boride, said refractory material having a particle size up to about 1 mm.; 1–10% by volume based on the total composition, of gamma-aluminum oxide having a particle size of about $5-50.10^{-6}$ mm.; and about 0.01–5% by volume based on the total composition of aluminum powder having a particle size of about $10^{-3}-10^{-1}$ mm., said gamma-aluminum oxide being produced by reacting gaseous aluminum halide at high temperatures with oxygen.

4. The composition of claim 3, wherein the refractory material is silicon carbide.

5. The composition of claim 3, wherein the refractory material is silicon nitride.

6. The composition of claim 3, wherein the refractory material is boron carbide.

7. The composition of claim 3, wherein the refractory material is boron nitride.

8. The composition of claim 3, wherein the refractory material is aluminum nitride.

9. The composition of claim 3, wherein the refractory material is aluminum boride.

10. In a process of fabricating shaped structures of a refractory material having a particle size up to 1 mm., and selected from the group consisting of silicon carbide, silicon nitride, boron carbide, boron nitride, aluminum nitride, and aluminum boride comprising the steps of mixing the refractory material with a binder, forming the mixture into a shaped structure, and sintering said shaped structure at elevated temperatures, the improvement comprising employing as the binder about 1–10% by volume of the total mixture, of gamma-aluminum oxide having a particle size of $5$–$50.10^{-6}$ mm. and 0.01–5%, by volume of the total mixture, of aluminum having a particle size of $10^{-3}$–$10^{-1}$ mm., said gamma-aluminum oxide being produced by reacting gaseous aluminum halide at high temperatures with oxygen; and conducting said sintering step at a temperature of at least 1400° C. in an atmosphere inert to said refractory material.

11. The process of claim 10, wherein the sintering temperature is at 1400–1700° C.

12. The process of claim 10, wherein the sintering step is conducted in a nitrogen-containing, reducing atmosphere.

13. The process of claim 10, wherein the refractory material is silicon carbide.

14. The process of claim 10, wherein the refractory material is silicon nitride.

15. The process of claim 10, wherein the refractory material is boron carbide.

16. The process of claim 10, wherein the refractory material is boron nitride.

17. The process of claim 10, wherein the refractory material is aluminum nitride.

18. The process of claim 10, wherein the refractory material is aluminum boride.

19. The process of claim 10 wherein the sintering step is conducted in a nitrogen-containing, reducing atmosphere at 1400–1700° C.

20. A binding agent comprising in parts by volume 1–10 parts gamma-aluminum oxide having a particle size of about $5$–$50.10^{-6}$ mm. and 0.01–5 parts by volume of aluminum having a particle size of about $10^{-3}$–$10^{-1}$ mm.

21. A binding agent consisting essentially of in parts by volume 1–10 parts gamma aluminum oxide having a particle size of about $5$–$50.10^{-6}$ mm. and 0.01–5 parts by volume of aluminum having a particle size of about $10^{-3}$–$10^{-1}$ mm.

22. A sinterable composition consisting essentially of refractory material selected from the group consisting of silicon carbide, silicon nitride, boron carbide, boron nitride, aluminum nitride and aluminum boride, said refractory material having a particle size up to about 1 mm.; 1–10% by volume based on the total composition, of gamma aluminum oxide having a particle size of about $5$–$50.10^{-6}$ mm.; and about 0.01–5% by volume based on the total composition of aluminum powder having a particle size of about $10^{-3}$–$10^{-1}$ mm.

23. The composition of claim 22, wherein the refractory material is silicon carbide.

24. The composition of claim 22, wherein the refractory material is silicon nitride.

25. The composition of claim 22, wherein the refractory material is boron carbide.

26. The composition of claim 22, wherein the refractory material is boron nitride.

27. The composition of claim 22, wherein the refractory material is aluminum nitride.

28. The composition of claim 22, wherein the refractory material is aluminum boride.

29. In a process of fabricating shaped structures of a refractory material having a particle size up to 1 mm., and selected from the group consisting of silicon carbide, silicon nitride, boron carbide, boron nitride, aluminum nitride, and aluminum boride comprising the steps of mixing the refractory material with a binder, forming the mixture into a shaped structure, and sintering said shaped structure at elevated temperatures, the improvement comprising employing as the binder about 1–10% by volume of the total mixture, of gamma aluminum oxide having a particle size of $5$–$50.10^{-6}$ mm. and 0.01–5% by volume of the total mixture, of aluminum having a particle size of $10^{-3}$–$10^{-1}$ mm., and conducting said sintering step at a temperature of at least 1400° C. in an atmosphere inert to said refractory material.

30. The process of claim 29, wherein the sintering temperature is at 1400–1700° C.

31. The process of claim 29, wherein the sintering step is conducted in a nitrogen-containing, reducing atmosphere.

32. The process of claim 29, wherein the refractory material is silicon carbide.

33. The process of claim 29, wherein the refractory material is silicon nitride.

34. The process of claim 29, wherein the refractory material is boron carbide.

35. The process of claim 29, wherein the refractory material is boron nitride.

36. The process of claim 29, wherein the refractory material is aluminum nitride.

37. The process of claim 29, wherein the refractory material is aluminum boride.

38. The process of claim 29, wherein the sintering step is conducted in a nitrogen-containing, reducing atmosphere at 1400–1700° C.

References Cited in the file of this patent

UNITED STATES PATENTS

| | | |
|---|---|---|
| 1,894,685 | Hediger | Jan. 17, 1933 |
| 2,040,236 | Benner et al. | May 12, 1936 |
| 2,388,080 | Riddle | Oct. 30, 1945 |
| 2,599,185 | Lepp et al. | June 3, 1952 |
| 2,613,153 | Stafford | Oct. 7, 1952 |
| 2,839,413 | Taylor | June 17, 1958 |
| 2,897,572 | Hansen | Aug. 4, 1959 |
| 2,979,414 | Ryshkewitch | Apr. 11, 1961 |
| 2,996,783 | Mayer | Aug. 22, 1961 |
| 3,000,071 | Wehrmann | Sept. 19, 1961 |

FOREIGN PATENTS

| | | |
|---|---|---|
| 829,799 | Great Britain | Mar. 9, 1960 |
| 832,278 | Great Britain | Apr. 6, 1960 |